United States Patent Office 2,917,555
Patented Dec. 15, 1959

2,917,555

PREVENTION OF DECOMPOSITION OF HALO-GENATED HYDROCARBON SOLVENTS

Leighton S. McDonald, Freeport, Harris G. Hughes, Angleton, and Clarence R. Crabb, Lake Jackson, Tex., assignors to The Dow Chemical Company, Midland, Mich., a corporation of Delaware No Drawing. Application August 1, 1958
Serial No. 752,416

4 Claims. (Cl. 260—652.5)

This invention relates to the prevention of decomposition of halogenated hydrocarbon solvents particularly trichloroethylene and perchloroethylene. It is known that these materials when exposed to air, light and heat decompose by oxidation with the formation of substances with objectionable characteristics, usually acidic substances, which render the solvent unsuitable for such purpose as metal vapor degreasing, dry cleaning and oil extracting. It is also known that when the halogenated hydrocarbons are exposed to excessive heat, they decompose by a condensation-type reaction to form hydrochloric acid together with a resinous material. In the presence of many metals, for example, iron, aluminum, zinc, copper or the aluminum-base metals, the hydrochloric acid thus formed reacts with these metals to form the chloride salts which act as catalysts for the condensation reaction. Thus, when this condensation reaction takes place in metal vapor degreasing where the chips of these metals are in contact with the boiling halogenated hydrocarbon solvents, the reaction, i.e., decomposition, often becomes autocatalytic. When this occurs, the solvent decomposes very vigorously with the evolution of large quantities of hydrochloric acid and the formation of a tarry or gummy mass in the solvent.

As the major applications of the chlorohydrocarbon solvents involve cyclic processes in which the solvent is recovered by distillation, the solvent should be protected with an inhibitor which is recovered with the solvent on distillation. For this same reason, the inhibitor used should not react with free fatty acids, a common contaminant in solvent applications. For example, in metal vapor-degreasing, buffing compounds and drawing oils are sources of fatty acid. Buffing compounds generally contain about 50 percent of stearic acid while drawing oils contain as much as 5 to 10 percent of oleic acid.

An object of this invention is to provide a stabilizer for chlorohydrocarbons, such as trichloroethylene and perchloroethylene, which will inhibit the normal oxidation decomposition reactions. Another object of this invention is to provide a stabilizer for trichloroethylene which will inhibit the condensation type decomposition reaction which is catalyzed by the presence of light, heat or oxygen. Still another object of this invention is to provide a stabilizer for trichloroethylene or perchloroethylene which can be readily recovered with the solvent and which need only be present in relatively small concentrations, usually a small fraction of one percent.

The chlorohydrocarbons, such as trichloroethylene, perchloroethylene, and the like, when stabilized with pyrroles in the manner of U.S. Patent 2,492,048; the oximes in the manner of U.S. Patent 2,371,646; the alkylamines as described in British Patent 391,156; or the 5-membered N- and S-heterocyclic compounds of U.S. Patent 2,517,893; are not lastingly stable under the severe conditions of present-day industrial users where strong light, oxygen and heat are encountered. The solutions are gradually depleted of stabilizer and are thus subject to decomposition and ultimately attach the materials being cleaned and/or containing the solvents.

It has now been found that chlorohydrocarbons such as trichloroethylene, perchloroethylene and the like, containing any one or more of the above mentioned stabilizers are materially improved in its ability to resist decomposition by light, heat and/or oxygen when an amine borane or an ammonium salt of borane or an alkyl-substituted borane is added to the already inhibited solvent. Thus if one adds from 0.001 percent by weight to 1.0 percent by weight of a borane compound, the solvent is stabilized against decomposition or polymerization even under severe conditions of light, oxygen and/or heat.

Borane compounds and preferably those boranes having the general formula

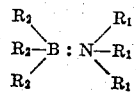

wherein each $R_1$ is lower alkyl or hydrogen and each $R_2$ is alkyl or hydrogen but at least one $R_2$ is hydrogen, are operable in accordance with the present invention. Following are examples of the boranes suitable as stabilizers according to the present invention: dimethylamine borane, trimethylamine borane, isopropylamine borane, methylamine methyl borane, dimethylamine methyl borane, trimethylamine methyl borane, dimethylamine methyl borane, and ammonium borane.

The following examples illustrate the present invention but are not to be construed as limiting.

*Examples 1–12*

Tests were conducted employing various inhibitors and stabilizers on 200-milliliter samples of trichloroethylene or perchloroethylene in which a strip of SAE 1010 steel was suspended. A second strip of the same type steel was suspended above the liquid to be in the vapor phase. An oxygen delivery tube was suspended to introduce oxygen into the liquid near the bottom of the flask containing the trichloroethylene. The rate of introduction was adjusted to introduce 10–12 bubbles per minute. A 150-watt electric light bulb was placed under the flask to provide heat and light to the system. The test was conducted for 48 hours at the reflux temperature and then the acidity of the solution measured as percent HCl.

The following table shows the results of such tests employing the various stabilizers as indicated.

| Example No. | Percent of Additive | Percent HCl After 48 Hrs. | Percent HCl After 24 Hrs. | Appearance after 48 Hrs. Accelerated Oxidation |
|---|---|---|---|---|
| 1 | .025 N-methylpyrrole | .0010 | | Dark amber. |
| 2 | .025 N-methylpyrrole+.005 dimethylamine borane | .0002 | | Medium amber. |
| 3 | .025 N-methylpyrrole+.0010 dimethylamine borane | .00015 | | Water white. |
| 4 | .025 pyrrole | | .0005 | Heavy black ppt. solution opaque. |
| 5 | .025 pyrrole+.0015 dimethylamine borane | | .0001 | Water white. |
| 6 | .025 pyrrole+.0030 dimethylamine borane | | No gain | Do. |
| 7 | .0025 N-methylpyrrole | .0020 | | Amber. |
| 8 | .0025 N-methylpyrrole+.002 dimethylamine borane | .0002 | | Water white. |
| 9 | .0020 dimethylamine borane | .047 | | Do. |
| 10 | .001 dimethylamine borane | .147 | | Do. |
| 11 | No stabilizer (control) | .250 | | Do. |
| 12 | 0.025 pyridine | 0.040 | 0.016 | |
| 13 | 0.025 pyridine+0.0020 dimethylamine borane | 0.009 | 0.005 | |
| 14 | 0.025 α-picoline | | 0.016 | |
| 15 | 0.025 α-picoline+0.0015 dimethylamine borane | | 0.002 | |
| 16 | 0.025 2,5-dimethyl-1,4-diazine | | 0.025 | |
| 17 | 0.025 2,5-dimethyl-1,4-diazine+0.0015 dimethylamine borane | | 0.002 | |

*Examples 18–21*

In the manner of the foregoing examples employing perchloroethylene in place of trichloroethylene there was obtained the following results after 24 hours.

| Example No. | Percent Additive(s) | Color at 24 Hrs. |
|---|---|---|
| 18 | 0.050 N-methyl pyrrole | very dark amber. |
| 19 | 0.050 N-methyl pyrrole +0.005 dimethylamine borane | water white. |
| 20 | 0.050 pyrrole | very dark amber. |
| 21 | 0.005 pyrrole+0.005 dimethylamine borane | light amber. |

We claim:
1. A stabilized chlorinated hydrocarbon solvent comprising from 0.001 to 1.0 percent by weight of a member selected from the group consisting of unsubstituted and alkyl-substituted pyrroles, N-lower alkyl substituted pyrroles, pyridine, α-picoline, oximes, isoxazolines, thiazole, thiazolines, lower alkylamines, unsubstituted and lower alkyl-substituted arylamines and diazines and from 0.001 to 1.0 percent by weight of a member having the formula:

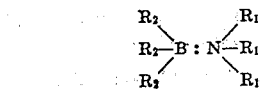

wherein each $R_1$ and $R_2$ are independently selected from the group consisting of hydrogen and lower alkyl and at least one $R_2$ is hydrogen.

2. A mixture comprising trichloroethylene, from 0.001 to 1.0 percent by weight of N-methylpyrrole and from .0001 to 1.0 percent by weight of dimethylamine-borane.

3. A mixture comprising of trichloroethylene, from 0.001 to 1.0 percent by weight of pyrrole and from .0001 to 1.0 percent by weight of dimethylamine-borane.

4. A mixture comprising trichloroethylene, from 0.001 to 1.0 percent by weight of pyridine and from .0001 to 1.0 percent by weight of dimethylamine-borane.

References Cited in the file of this patent

UNITED STATES PATENTS

| 2,096,735 | Dinley | Oct. 26, 1935 |
| 2,371,644 | Petering et al. | Mar. 20, 1945 |
| 2,371,646 | Petering et al. | Mar. 20, 1945 |
| 2,492,048 | Klabunde | Dec. 20, 1949 |
| 2,795,623 | Starks | June 11, 1957 |